United States Patent
Tanimoto (10) Patent No.: US 9,179,037 B2
(45) Date of Patent: Nov. 3, 2015

(54) IMAGE FORMING APPARATUS, CONTROLLING DEVICE AND NON-TRANSITORY COMPUTER READABLE MEDIUM FOR PROVIDING AN AVAILABLE STORAGE SPACE

(71) Applicant: FUJI XEROX CO., LTD., Tokyo (JP)

(72) Inventor: Kazuhito Tanimoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 105 days.

(21) Appl. No.: 13/964,674

(22) Filed: Aug. 12, 2013

(65) Prior Publication Data

US 2014/0268202 A1     Sep. 18, 2014

(30) Foreign Application Priority Data

Mar. 15, 2013   (JP) ................................ 2013-053923

(51) Int. Cl.
   *G06K 15/00*   (2006.01)
   *H04N 1/40*    (2006.01)

(52) U.S. Cl.
   CPC ...................... *H04N 1/40* (2013.01)

(58) Field of Classification Search
   CPC ........................................................ H04N 1/41
   USPC ....................................... 358/1.14, 1.16, 1.17
   See application file for complete search history.

(56) References Cited

U.S. PATENT DOCUMENTS

| | | | |
|---|---|---|---|
| 5,889,596 A | 3/1999 | Yaguchi et al. | |
| 2002/0080382 A1* | 6/2002 | Ohtsu | 358/1.14 |
| 2007/0121161 A1* | 5/2007 | Yamada | 358/1.16 |
| 2009/0066988 A1 | 3/2009 | Imaizumi | |

FOREIGN PATENT DOCUMENTS

| | | |
|---|---|---|
| JP | H07-273957 A | 10/1995 |
| JP | A-9-284510 | 10/1997 |
| JP | 2004-201229 A | 7/2004 |
| JP | A-2007-324916 | 12/2007 |
| JP | 2008-028887 A | 2/2008 |

OTHER PUBLICATIONS

Translation of Jul. 21, 2015 Office Action issued in Japanese Application No. 2013-053923.

* cited by examiner

*Primary Examiner* — Fred Guillermety
(74) *Attorney, Agent, or Firm* — Oliff PLC (57) ABSTRACT

An image forming apparatus includes: an image reading unit reading an image on a document at a predetermined image reading speed and generating image data; a memory including a first area temporarily storing the image data and a second area storing the image data read from the first area and subjected to processing; an image forming unit forming an image on a recording material based on the image data stored in the memory; a reducing unit that, in a case where an amount of the image data stored in the second area exceeds a predetermined amount, reduces an amount of the image data generated per unit time by the image reading unit; and an allocation unit that, in the case where the amount of the image data stored in the second area exceeds the predetermined amount, allocates a partial area contained in the first area to the second area.

7 Claims, 12 Drawing Sheets

| SIZE OF RAM | 40MB | 60MB | 120MB |
|---|---|---|---|
| SIZE OF AREA FOR COLLATION | 5MB | 10MB | 20MB |

| VERSION OF SOFTWARE | BASE SIZE | FUNCTION | | |
|---|---|---|---|---|
| | | COPY | SCAN | PRINT |
| Ver1.00 | 1MB | 3MB | 2MB | 1.5MB |
| Ver2.00 | 1MB | 3.5MB | 2MB | 2MB |
| Ver3.00 | 1.5MB | 4MB | 2.5MB | 2MB |

| MEMORY SIZE | COLLATION | SCALING | NORMAL |
|---|---|---|---|
| 40MB | .... | .... | .... |
| 60MB | .... | .... | .... |
| 120MB | .... | .... | .... |

FIG.9

| SCALING | CHARACTER | CHARACTER/ PHOTOGRAPH | PHOTOGRAPH |
|---|---|---|---|
| 200% | .... | .... | .... |
| 140% | .... | .... | .... |
| 100% | .... | .... | .... |
| 70% | .... | .... | .... |
| 50% | .... | .... | .... |

FIG.10

| SIZE OF RAM | 40MB | 60MB | 120MB |
|---|---|---|---|
| SIZE OF AREA FOR COLLATION | 5MB | 10MB | 20MB |

FIG.11

IMAGE FORMING APPARATUS, CONTROLLING DEVICE AND NON-TRANSITORY COMPUTER READABLE MEDIUM FOR PROVIDING AN AVAILABLE STORAGE SPACE

CROSS REFERENCE TO RELATED APPLICATIONS

This application is based on and claims priority under 35 USC §119 from Japanese Patent Application No. 2013-053923 filed Mar. 15, 2013, incorporated herein by reference in its entirety.

BACKGROUND

1. Technical Field

The present invention relates to an image forming apparatus, a controlling device and a non-transitory computer readable medium.

2. Related Art

In image forming apparatuses or image readers, various measures are suggested against the case where no storage space is available in a memory in image reading process.

SUMMARY

According to an aspect of the present invention, there is provided an image forming apparatus including: an image reading unit that reads an image on a document at a predetermined image reading speed and generates image data; a memory that includes a first area temporarily storing the image data outputted from the image reading unit and a second area storing the image data having been read from the first area and subjected to processing, the memory temporarily storing the image data; an image forming unit that forms an image on a recording material based on the image data stored in the memory, which has been subjected to the processing; a reducing unit that, in a case where an amount of the image data stored in the second area exceeds a predetermined amount, reduces an amount of the image data generated per unit time by the image reading unit; and an allocation unit that, in a case where the amount of the image data stored in the second area exceeds the predetermined amount, allocates a partial area contained in the first area to the second area.

BRIEF DESCRIPTION OF THE DRAWINGS

An exemplary embodiment of the present invention will be described in detail based on the following figures, wherein.

DETAILED DESCRIPTION

Hereinafter, an exemplary embodiment according to the present invention will be described in detail with reference to the attached drawings.

Figure 1:
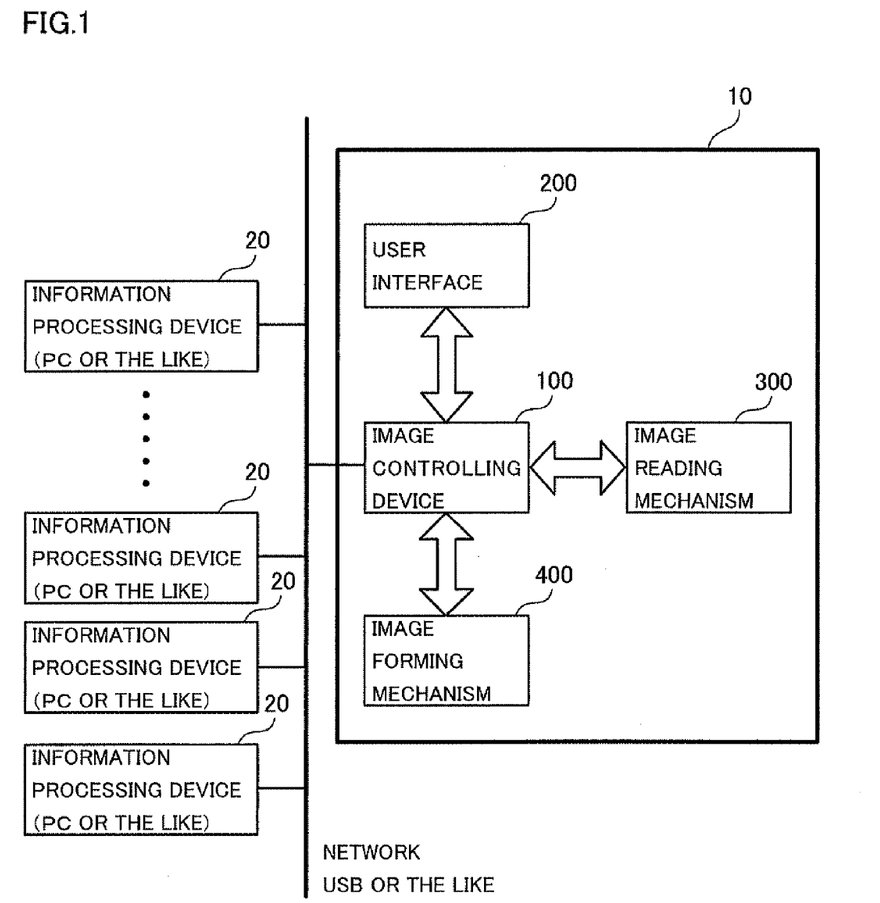
FIG. 1 is a diagram showing an image forming system related to an exemplary embodiment according to the present invention.

FIG. 1 is a diagram showing an image forming system related to the exemplary embodiment according to the present invention.

The image forming system of the exemplary embodiment is provided with an image forming apparatus 10 including a printing function, a scanning function and a copying function, and plural information processing devices 20 (personal computers or the like) connected to the image forming apparatus 10 via a network, a USB or the like.

The image forming apparatus 10 includes: an image controlling device 100, a user interface 200; an image reading mechanism 300 and an image forming mechanism 400.

The image controlling device 100 has charge of controlling a flow of image data, image processing and the like. The user interface 200 is, for example, configured with a monitor of a touch panel type to perform display of information to a user and to receive information inputted by a user. It should be noted that control information required to operate the image forming apparatus 10 is obtained by, for example, being inputted by a user from the interface 200. Or, for example, the control information is obtained by being sent from the information processing device 200 to the image forming apparatus 10.

The image reading mechanism 300 as an example of an image reading unit is the so-called scanning device, and reads an image recorded on a document (sheet) to generate image data. Here, the image reading mechanism 300 of the exemplary embodiment is provided with a light source (not shown) for irradiating a document with light. The image reading mechanism 300 is also provided with an image reading section (not shown) that receives light reflected from the document by a line sensor or the like to read an image on the document.

Moreover, the image reading mechanism 300 is provided with a document transport mechanism that transports documents one by one from a document bundle configured with plural documents to a reading position by the image reading section. Further, the image reading mechanism 300 is provided with a document glass (not shown) configured with a transparent glass plate, on which a document is placed when a user sets documents. It should be noted that, when image reading of the document placed on the document glass is performed, an image is read by the image reading section moving along the document glass.

Here, the image reading mechanism 300 of the exemplary embodiment is configured such that an image on a document is read at a reading speed, of plural reading speeds, corresponding to a control signal from the image controlling device 100. For example, in a case where instructions to reduce the reading speed of an image are provided from the image control device 100 and an image on a document transported by the document transport mechanism is to be read, the transport speed of the document is reduced in the document transport mechanism. Moreover, for example, in a case where instructions to reduce the reading speed of an image are provided from the image control device 100 and an image on a document placed on the document glass is to be read, the moving speed of the image reading section is reduced.

Next, the image forming mechanism 400 will be described. The image forming mechanism 400 is a so-called printer to form an image on a sheet or the like, which is a recording material. It should be noted that, in the image forming mechanism 400 of the exemplary embodiment, an image is formed on a sheet by an electrophotographic system; however, the image may be formed by other systems such as an ink-jet system.

Figure 2:
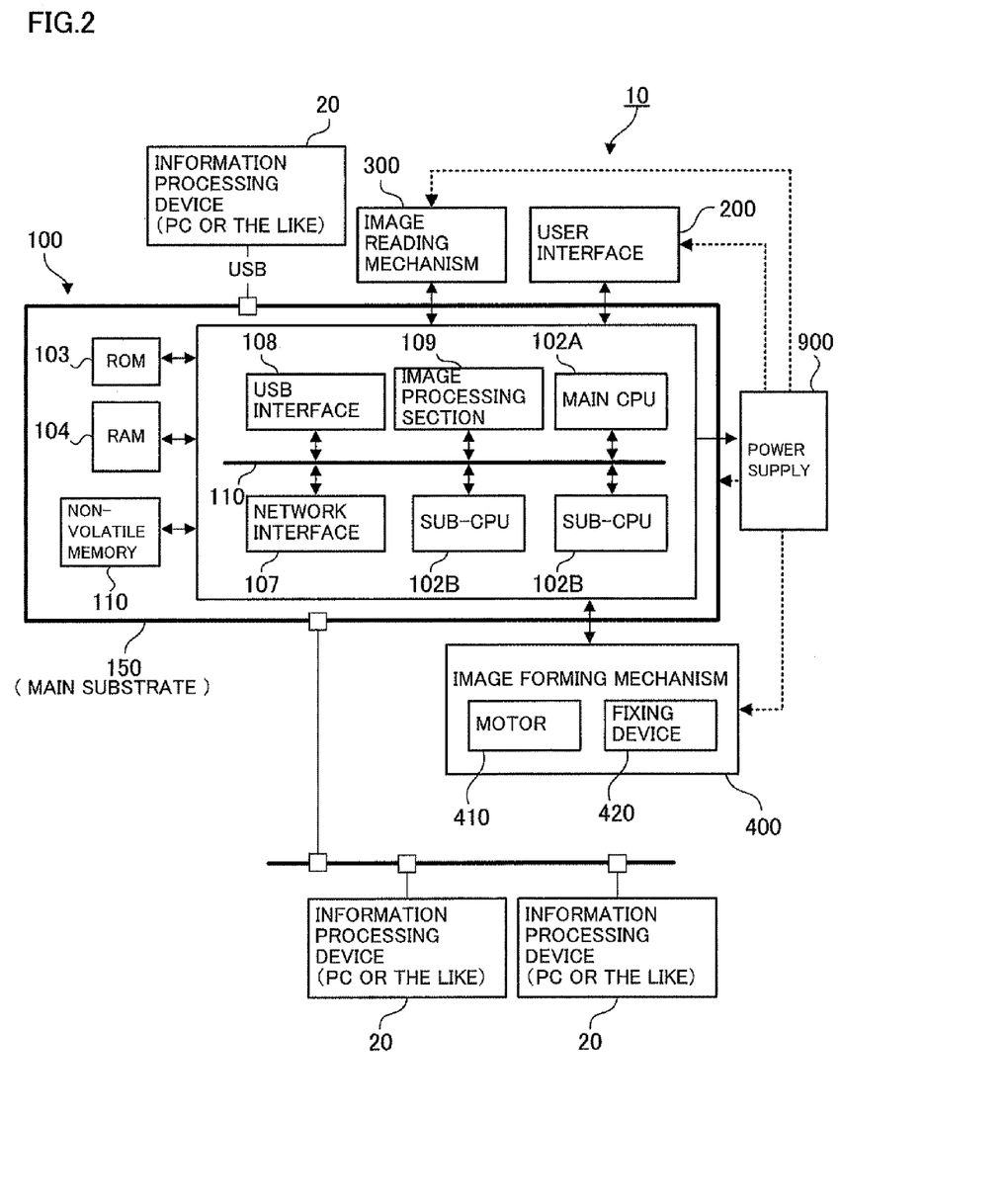
FIG. 2 is a block diagram showing an internal configuration of an image controlling device.

FIG. 2 is a block diagram showing an internal configuration of the image controlling device 100.

The image controlling device 100 is provided with a main substrate 150 on which a main CPU (central processing unit) 102A, plural sub-CPUs 102B that are configured at a cost lower than the main CPU 102A to mainly perform real-time control such as motor control, a ROM (read only memory) 103, a RAM (random access memory) 104, a network interface 107, a USB interface 108, an image processing section 109 and a non-volatile memory 110 are provided.

It should be noted that, though description is omitted above, the image forming apparatus 10 of the exemplary embodiment is provided with a power supply 900, as shown in FIG. 2, for feeding electricity to each component. Moreover, the image forming mechanism 400 that functions as an image forming unit is provided with a motor 410 that drives a driving section inside the image forming mechanism 400, an image forming section (not shown) that forms an image on a sheet, and a fixing device 420 that applies heat to a sheet for fixing an image on a sheet. It should be noted that, in the exemplary embodiment, the main CPU 120A and the sub-CPUs 102B are provided on the main substrate 150 to perform control by the main CPU 120A and the sub-CPUs 102B; however, the control may be performed by 1-chip utility SoC (system-on-chip) having a similar configuration.

Here, the main CPU 102A executes programs stored in the ROM 103 and the RAM 104, to thereby perform an entire control. The ROM 103 is a memory for storing programs with non-volatility. Of the programs stored in the ROM 103, part of the programs that are operated at power-on is executed, for example, by the main CPU 102A just as is stored in the ROM 103.

Other programs are decompressed in the RAM 104 at power-on, to be executed, for example, by the main CPU 102A with required timing. If the main CPU 102A executes a program with the program being stored in the ROM 103, operation speed is slow; therefore, here, a program is temporarily decompressed in the RAM 104, which is capable of high-speed access, and the main CPU 102A executes the program with the program being decompressed in the RAM 104. It should be noted that, in the exemplary embodiment, description is given with the case where a program is stored in the ROM 103 as an example; however, the program may be stored in the non-volatile memory 110.

The network interface 107, as an image data obtaining unit, carries out communications with the information processing device 20 connected via a network to receive control data or image data sent from the image processing device 20. Moreover, the network interface 107 sends image data or the like to the information processing device 20. The USB interface 108 employs a communications method conforming to a USB standard and carries out communications with the information processing device 20.

The image forming apparatus 10 of the exemplary embodiment has three functions of printing, scanning and copying. For example, when the image forming apparatus 10 is used as a printer, image data is obtained from the external information processing devices 20 via the network interface 107 or the USB interface 108. Then, the image data is sent to the image forming mechanism 400 and an image is formed on a sheet at the image forming mechanism 400.

When the image forming apparatus 10 is used as a scanner, images on a document are read by the image reading mechanism 300 to generate image data, and the image data is sent to the external information processing devices 20 via the network interface 107 or the USB interface 108. Further, when the image forming apparatus 10 is used as a copying machine, first, images on a document are read by the image reading mechanism 300, and image data is generated. Thereafter, the image data is sent to the image forming mechanism 400 and an image based on the image data is formed on a sheet at the image forming mechanism 400.

Figure 3:
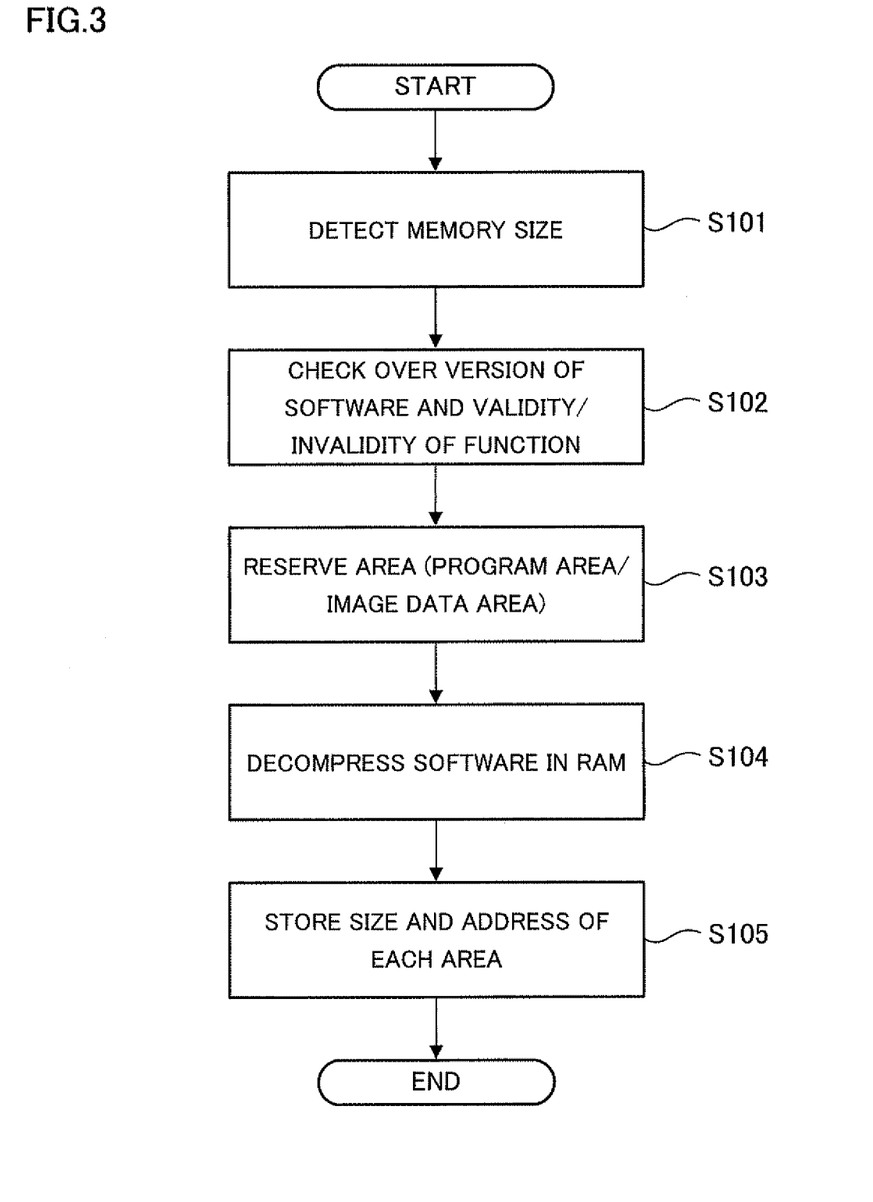
FIG. 3 is a flowchart of a program executed at power-on of an image forming apparatus.

FIG. 3 is a flowchart of a program executed at power-on of the image forming apparatus 10.

When the power is turned on, first, a memory size (size of a storage area) of the RAM 104 is detected (step 101), and then, a version of software (SW) stored in the ROM 103 or validity/invalidity of a function is checked over (step 102). It should be noted that the program executed in a process shown in FIG. 3 is executed by the main CPU 102A with a state of being stored in the ROM 103.

Though the image forming apparatus 10 of the exemplary embodiment has all the functions of the printing function, the scanning function and the copying function, even in an apparatus, for example, having only the copying function or in an apparatus having only the printing function, the program is shared. Accordingly, in the exemplary embodiment, validity/invalidity of a function of the image forming apparatus 10 is checked over.

Figure 4:
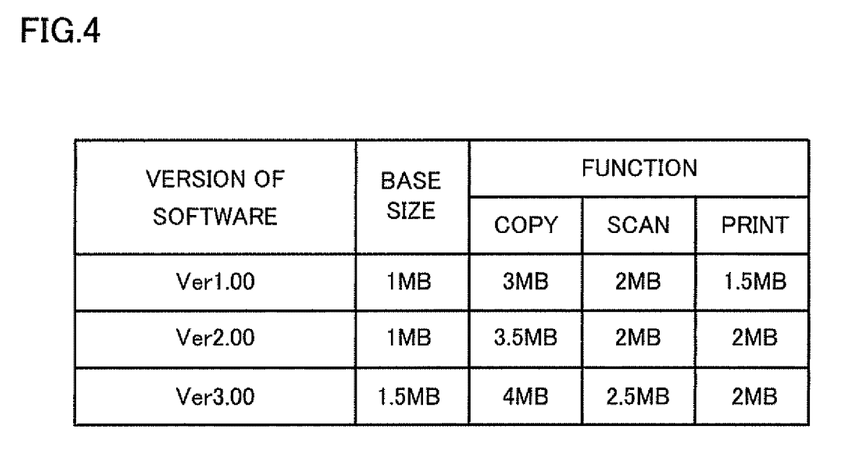
FIG. 4 is a diagram showing a size of a program determined based on a version of software and validity/invalidity of various functions.

FIG. 4 is a diagram showing a size of a program determined based on a version of software and validity/invalidity of various functions.

In the ROM 103, the table shown in FIG. 4 is stored, and in step 103 in the flowchart shown in FIG. 3, first, the table shown in FIG. 4 is referred to and the size of a program area required on the RAM 104 is obtained, and further, the program area is reserved on the RAM 104.

Here, for example, in a case where the version of the software is Ver 3.00 and the image forming apparatus 10 has all the functions of the copying, scanning and printing, the size of the program area is determined to be 10 (=1.5+4+2.5+ 2) (MB). Next, in step 103, an image data area, which is an area for storing image data, is reserved on the RAM 104. It should be noted that, in the exemplary embodiment, the area on the RAM 104 except for the program area is reserved as the image data area. It should be noted that, in the exemplary embodiment, the size of the program area is determined depending upon presence or absence of the copying function, the scanning function and the printing function in this manner; however, the size of the program area may be determined in consideration of presence or absence of a networking function, presence or absence of a decomposing (generating image data from PDL) function and the like.

Figure 5:
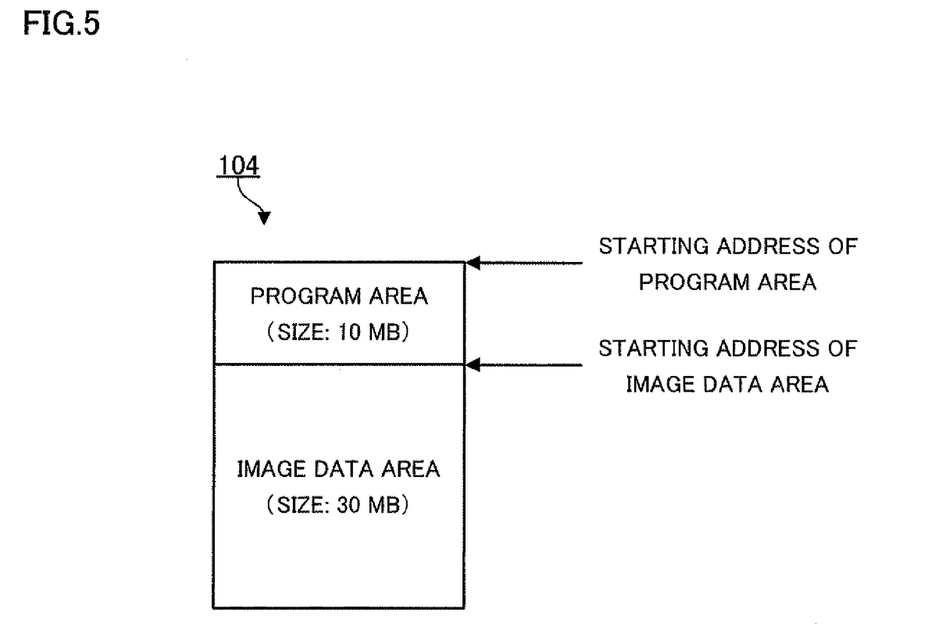
FIG. 5 is a diagram showing a memory map.

FIG. 5 is a diagram showing a memory map.

Here, for example, in a case where the RAM 104 has a memory size of 40 MB, 10 MB is allocated as the program area and the remaining 30 MB is reserved as the image data area where image data is to be stored.

With reference to FIG. 3, the flow of the process will be described further.

In step 104 shown in FIG. 3, the programs and various tables stored in the ROM 103 are transferred to the above-described program area in the RAM 104. At this time, programs of invalid functions are not transferred. Further, in the exemplary embodiment, the size and address of each area (the program area and the image data area) is stored in the ARM 104 (step 105).

Figure 6:
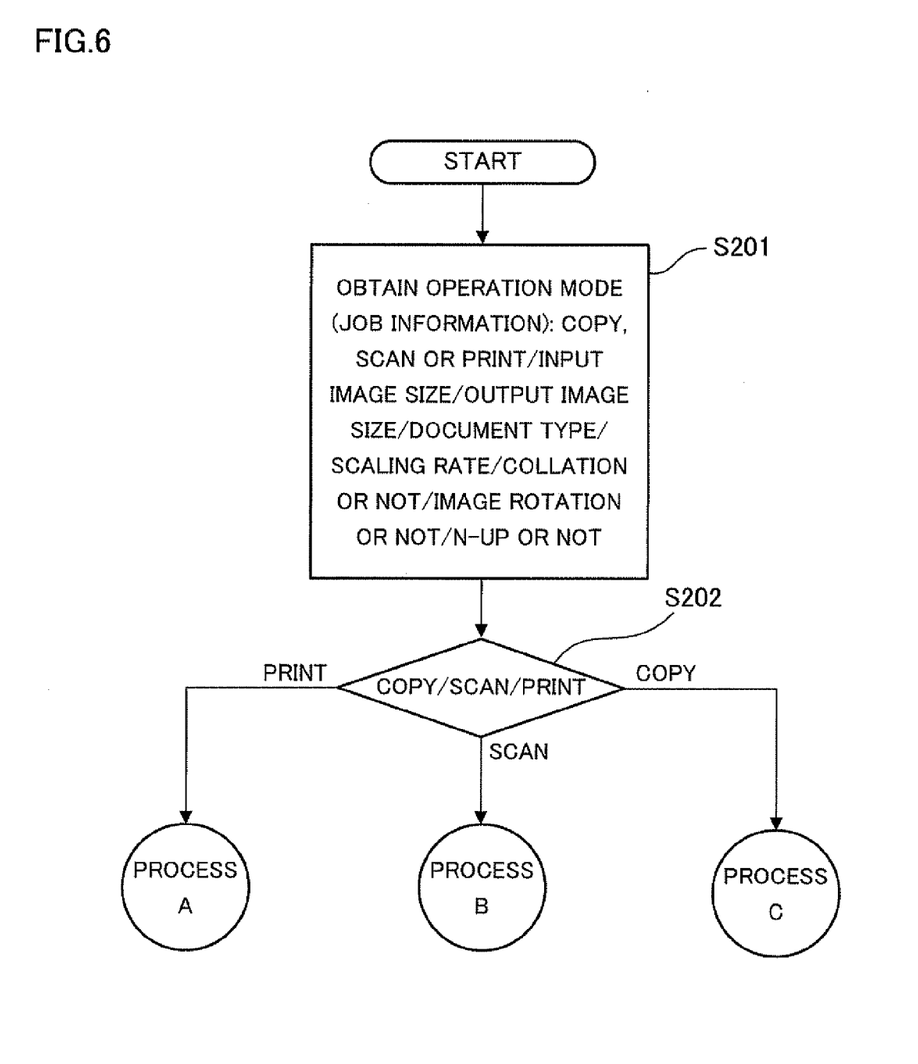
FIG. 6 is a flowchart of a program executed when a job is started.

FIG. 6 is a flowchart of a program executed when a job is started.

This program is stored in the program area of the RAM 104 at power-on, and executed in that state. In the program, first, job information is obtained, which includes information such as which is the function, copying, scanning or printing, an input image size, an output image size, a document type, a scaling rate, whether or not there is a designation of collation, whether or not an image is to be rotated and whether or not there is a setting for N-up (putting images of N pages on a single sheet) (step 201).

Here, the document type means distinction between a document containing characters, a document containing photographs and a document containing mixture of characters and photographs, and the type is designated by a user. In addition, some of the job information obtained in step 201 is automatically detected, and others are set by the user interface 200 (refer to FIG. 1), or sent as the control signals from the external information processing devices 20.

Next, in the process of the exemplary embodiment, it is determined that whether the function is printing, scanning or copying (step 202), and in accordance with the determination result, the flow proceeds to one of process A, process B and process C.

Figure 7:
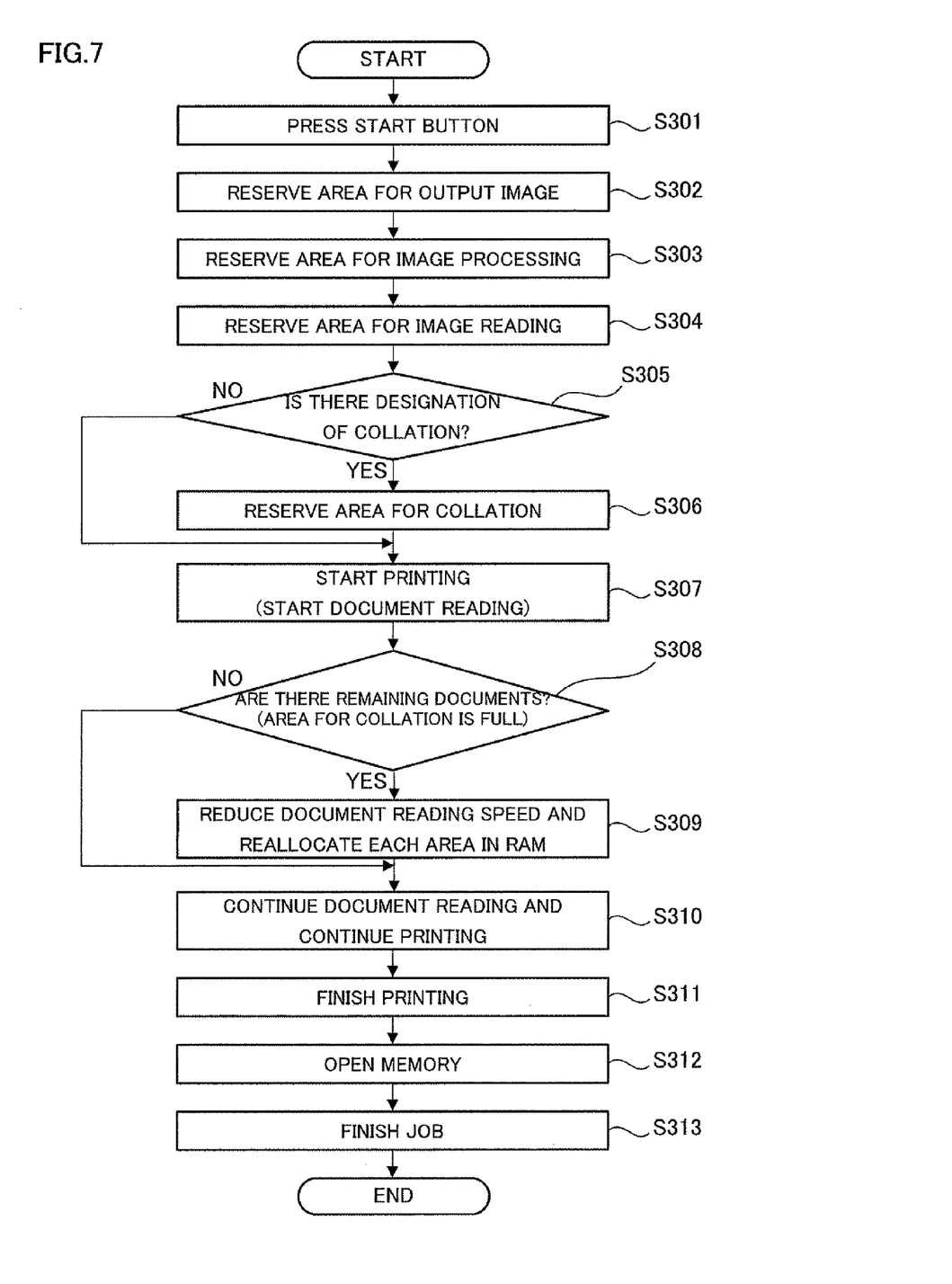
FIG. 7 is a flowchart of a program for a process executed in a copy mode.

FIG. 7 is a flowchart of a program for process C executed in a copy mode.

In the copy mode, first, the process is started by pressing a not-shown start button (step 301). First of all, an area for output images is reserved on the RAM 104 (step 302). Here, the area for output images has a function as a buffer that stores image data to be outputted to the image forming mechanism 400. It should be noted that the size of the area for output images is determined based on a read image size, an output image size, a scaling rate and the like. Next, in the exemplary embodiment, an area for image processing to be used for image processing is reserved on the RAM 104 (step 303).

Figure 8:
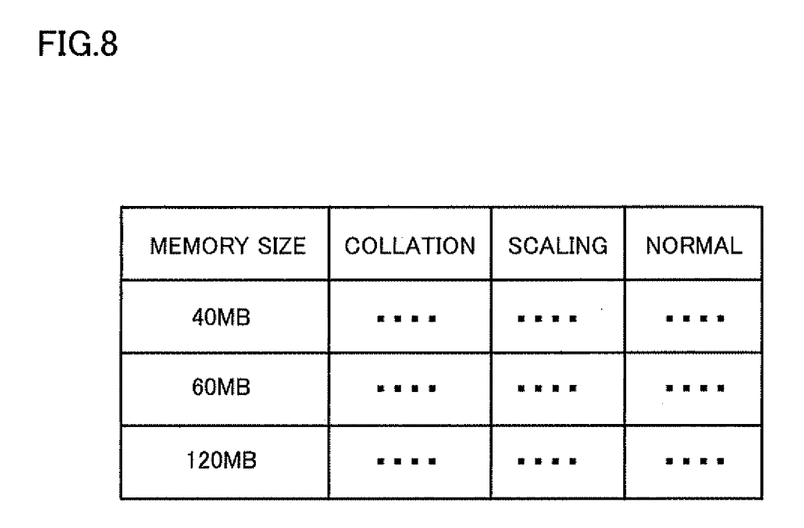
FIG. 8 is a diagram showing a table used in determining a size of an area for image processing.

FIG. 8 is a diagram showing a table used in determining a size of the area for image processing.

In the ROM 103, the table shown in FIG. 8 is stored in advance, and the table shown in FIG. 8 is referred to in determining the size of the area for image processing. For example, when a memory size of the RAM 104 is 40 MB and the setting is normal without collation and scaling, the field indicating 40 MB and normal is referred to, and thereby the size of the area for image processing is determined. To be more specifically described, in determining the size of the area for image processing, the table shown in FIG. 8 is referred to, and first, a parameter is selected from the table. Thereafter, arithmetic computations are performed by use of the selected parameter, to thereby determine the size of the area for image processing.

Next, in the exemplary embodiment, an area for image reading that plays a role of a first area, where image data obtained by the image reading mechanism 300 is temporarily stored, is reserved on the RAM 104 (step 304). Here, the size of the area for image reading is determined based on the image processing speed in performing image processing by the image processing section 109 (refer to FIG. 2) and the image reading speed in reading an image by the image reading mechanism 300.

Figure 9:
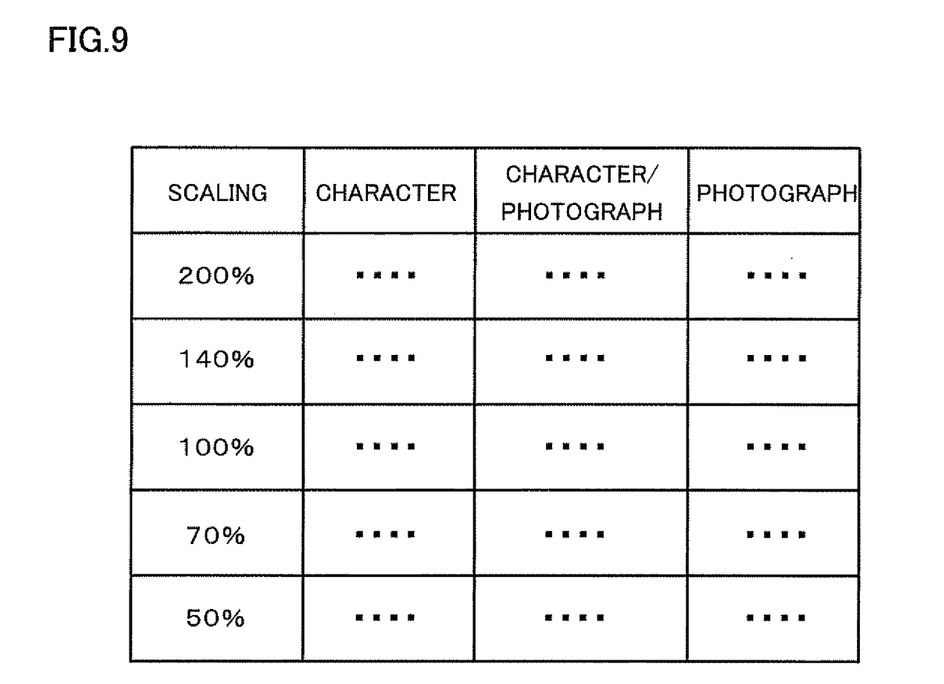
FIG. 9 is a diagram showing a table used in obtaining an image processing speed.

FIG. 9 is a diagram showing a table used in obtaining an image processing speed.

In the ROM 103, the table shown in FIG. 9 is stored in advance, and the table shown in FIG. 9 is referred to in obtaining the image processing speed. In the table shown in FIG. 9, the image processing speeds corresponding to the scaling rates and the document types (distinction between characters, characters/photographs and photographs) are indicated. In the exemplary embodiment, the image processing speed is obtained by referring to the table. To be described more specifically, in obtaining the image processing speed, the table shown in FIG. 9 is referred to, and first, a parameter corresponding to the scaling rate and the document type (distinction between characters, characters/photographs and photographs) is selected from the table. Thereafter, arithmetic computations are performed by use of the selected parameter, to thereby obtain the image processing speed. Then, in the exemplary embodiment, difference between the image processing speed and the image reading speed is calculated, and the size of the area for image reading required to read a document is determined from the difference.

Here, the area for image reading is an area where the image data obtained by the image reading mechanism 300 is first and temporarily stored. When the image processing is performed, the image data is read from the area for image reading, and thereafter, the image processing is executed by the image processing section 109. Here, in the exemplary embodiment, the image reading and the image processing are performed in parallel. Consequently, it is sufficient for the area for image reading to have a small size if the image processing speed exceeds the image reading speed, and in a case where the image processing speed is slower than the image reading speed, an amount of image data in the area for image reading is increased while performing image reading.

Description will be given further with reference to FIG. 7.

Thereafter, in the exemplary embodiment, it is determined whether collation is designated or not (step 305), and in a case where the collation is designated, an area for collation, as an example of a second area, is reserved on the RAM 104 (step 306). It should be noted that, in a case where collation is not designated, the process in step 307 (to be described later) is performed without carrying out the process in step 306.

Here, collation means, assuming that the page numbers are 1, 2 and 3 (in the case of three pages), images of the pages are formed on the sheets in the order of 1, 2, 3, 1, 2, 3, 1, 2, 3 (in the case of making three copies). When the collation is carried out, since it is necessary to start image formation after storing all image data of all pages (for example, three pages) contained in a document bundle, an area sufficient to store all image data of all pages is required. The larger the size of the area for collation is, the more pages it becomes possible to collate.

Figure 10:
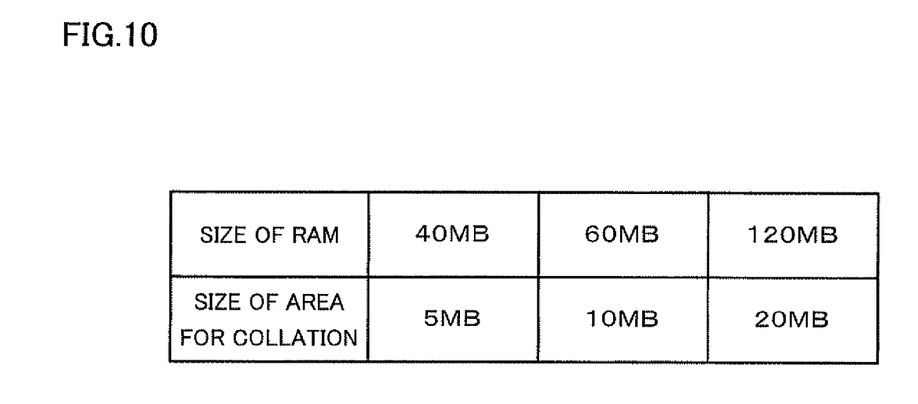
FIG. 10 is a diagram showing a correspondence table between a size of RAM and a size of area for collation.

FIG. 10 is a diagram showing a correspondence table between the size of the RAM 104 and the size of the area for collation. In the ROM 103, the table shown in FIG. 10 is stored in advance, and the table shown in FIG. 10 is referred to in determining the size of the area for collation. For example, in a case where the size of the RAM 104 is 40 MB, the size of the area for collation is determined to be 5 MB.

Figure 11:
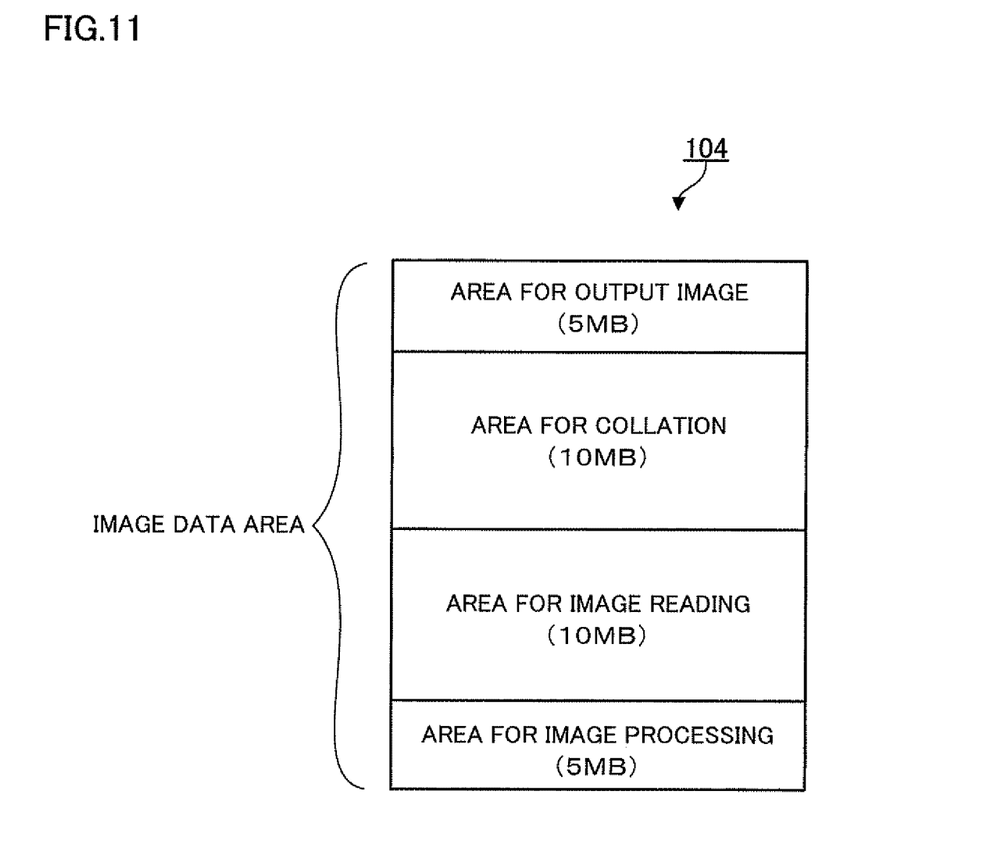
FIG. 11 is a diagram showing an example of the memory map.

FIG. 11 is a diagram showing an example of the memory map in the case where collation is designated.

In the specific example shown here, the image data area of 30 MB shown in FIG. 5 is divided into the area for output images of 5 MB, the area for image reading of 10 MB, the area for image processing of 5 MB and the area for collation of 10 MB.

The image data obtained by the image reading mechanism 300 is temporarily stored in the area for image reading, and subjected to image processing while using the area for image processing, to be stored in the area for output images. Thereafter, if collation is designated, the image data in the area for output images is subjected to a compression process and stored in the area for collation. When the image data up to the last page is obtained, then, the compressed image data is read from the area for collation in the order of page number to be decompressed, and thereby stored in the area for output images. The image data in the area for output images is sent to the image forming mechanism 400, and an image is formed on a sheet based thereon.

It should be noted that, in the case where collation is designated, in the exemplary embodiment, after the image data up to the last page is obtained (after all the documents are read), compressed image data is read from the area for collation in the order of page number to be subjected to the decompression process and stored in the area for output images again, and thereafter, the image data in the area for output images is outputted to the image forming mechanism 400, as described above. By the way, the process to be performed in the case where the collation is designated is not limited to the above-described process. For example, in a case where the collation is designated and plural copies are to be printed, the following process may be performed: when the first copy is printed, storage of the image data in the area for collation and output of the image data to the image forming mechanism 400 are performed in parallel; and when the second and subsequent copies are printed, the image data stored in the area for collation is outputted to the image forming mechanism 400.

Moreover, in FIG. 11, the memory map in the case where the collation is designated is shown; however, in the case where no collation designation is provided, the size of the area for collation becomes 0 MB (no area exists).

Further, in the exemplary embodiment, the area for collation is arranged on the area for image reading (the area for collation and the area for image reading are arranged such that addresses of these areas are continued on a boundary) to cause these areas to be continued when reallocation is carried out (to be described later).

With reference to FIG. 7 again, description will be given of the process of step 307 and steps subsequent thereto. It should be noted that, in the process of step 307 and subsequent steps, the case where the collation is designated will be described.

As described above, after the area for image reading, the area for image processing, the area for collation and the area for output images are reserved, reading of the documents is started, to thereby start printing (copying) (step 307).

Accordingly, image data is sequentially outputted from the image reading mechanism 300, and the image data is stored in each of the area for image reading, the area for image processing, the area for collation and the area for output images. To be described specifically, plural documents included in a document bundle are read by the image reading mechanism 300 one by one, and thereby image data corresponding to each page is sequentially generated. Thereafter, the image data is caused to be stored in each of the area for image reading, the area for image processing, the area for collation and the area for output images.

Incidentally, in the case where the document has many pages, there is a possibility that a large amount of image data is stored in the collation data, and there is no available capacity. In such a case (the amount of image data stored in the area for collation exceeds a predetermined amount), in the exemplary embodiment, first, it is determined that whether or not there are any documents not yet read (remaining documents) in the image reading mechanism 300 (step 308). Then, if it is determined that there are remaining documents in step 308, the main CPU 102A that functions as a reducing unit and an allocation unit reduces the reading speed of the documents and performs reallocation of each area in the RAM 104 (step 309).

Here, reduction of the reading speed of the document is carried out by reducing the transporting speed of the documents when documents are transported by the document transport mechanism, and by reducing the moving speed of the image reading section when the documents on the document glass are to be read. Moreover, reallocation of each area in the RAM 104 is actualized by reducing the area for image reading and allocating the reduced area (part of the area for image reading) to the area for collation. To be described further, in the exemplary embodiment, when the image reading speed is reduced, part of the area for image reading having been used until then becomes available (becomes an available area). In the exemplary embodiment, the part of the area that becomes available is allocated to the area for collation.

To be described further, in the exemplary embodiment, when the reading speed of the documents is reduced, an amount of the image data generated per unit time by the image reading mechanism 300 is also reduced. Accordingly, there occurs an excessive part of the area for image reading, and the excessive area is allocated to the area for collation. It should be noted that, in the exemplary embodiment, the amount of the image data generated per unit time by the image reading mechanism 300 is reduced by decreasing the reading speed of the documents; however, the amount of the image data generated per unit time may be reduced by, for example, deteriorating resolution in reading the image by the image reading mechanism 300.

It should be noted that, though description is omitted above, in the exemplary embodiment, when the above described area that is excessive in the area for image reading is allocated to the area for collation, the allocation is performed such that the area for collation initially reserved and the area to be allocated from now on (the area that is excessive in the area for image reading) are continued. This suppresses occurrence of fragmentation, to thereby suppress occurrence of unused areas generated with fragmentation. In this case, stabilization of the system is sought.

It should be noted that, in the exemplary embodiment, in the case where it is determined in step 308 that the remaining documents exist as described above, the reading speed of the document is reduced. In the case where the reading speed of the documents is reduced in this manner, it becomes possible to reduce an amount of light in the light source for irradiating the documents with light. In such a case, deterioration of the light source is suppressed in comparison with the case where the amount of light is not reduced. Moreover, in this case, consumption of electric power is reduced.

Thereafter, in the exemplary embodiment, reading the image on the document and the printing process by the image forming mechanism 400 are continued (step 310). Here, in a case where reallocation of the area as in the exemplary embodiment is not carried out (in a case where area for collation is not increased), printing is compelled to be ceased or compelled to be performed based on only the image data stored in the area for collation until then. On the other hand, in the process of the exemplary embodiment, since the area for collation is increased, possibility of reading of all the documents and performing collation process based on all the documents is increased compared to the case where the area for collation is not increased.

It should be noted that, in the case where it is determined that there are no remaining documents in step 308, since it is unnecessary to increase the area for collation, reduction of the reading speed and reallocation of the areas are not carried out. Thereafter, in the exemplary embodiment, when printing (copying) of the predetermined number of sheets is finished (step 311), the RAM 104 is opened (step 312) and the job is ended (step 313).

Next, another processing example will be described.

Figure 12:
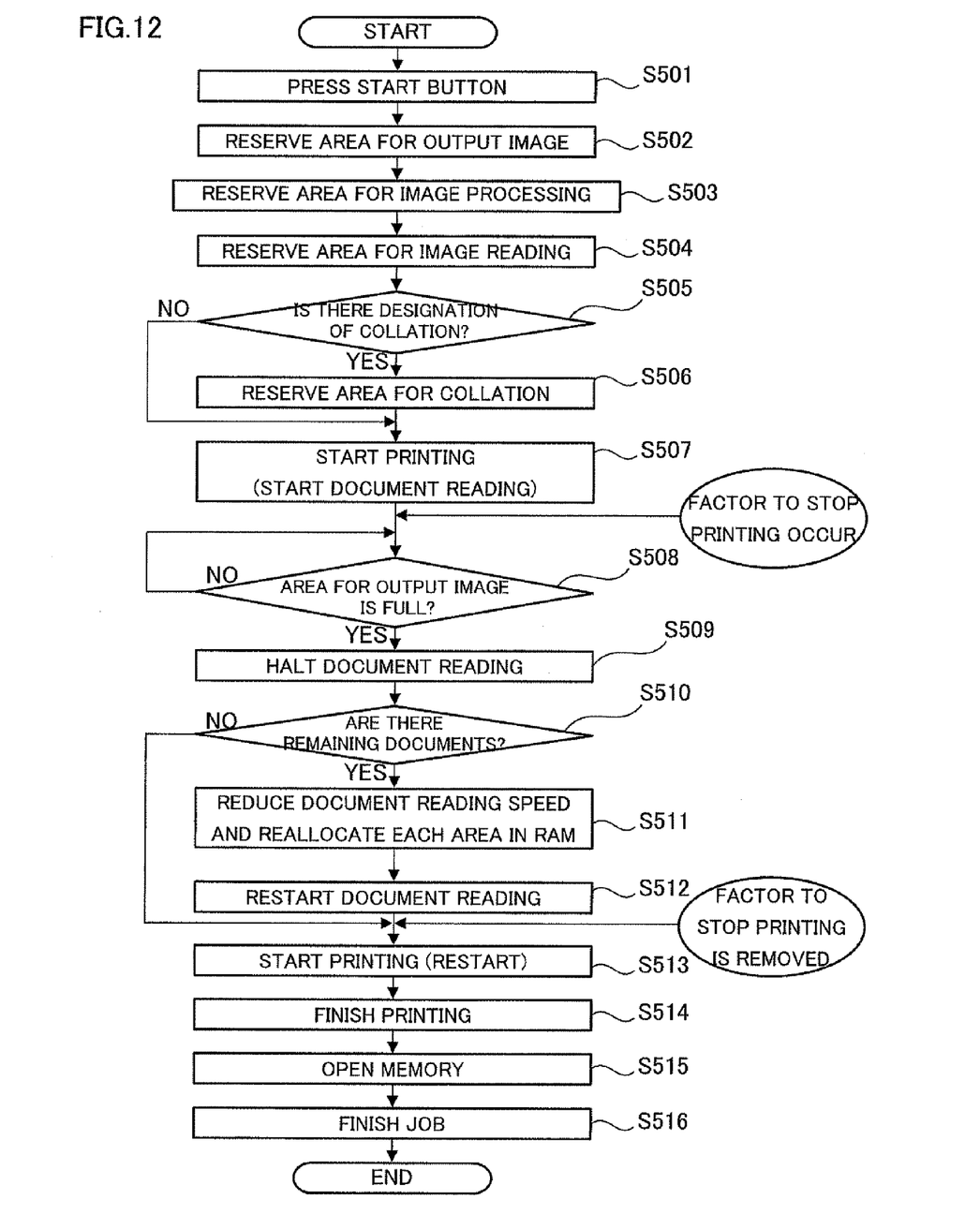
FIG. 12 is a flowchart of another program for the process executed in a copy mode.

FIG. 12 is a flowchart of another program for the process C executed in a copy mode.

It should be noted that the processes in step 501 to step 507 are similar to the processes in step 301 to step 307 in FIG. 7, and therefore, in the following description, the processes in step 508 and steps subsequent thereto will be described.

Here, in this process, whether a factor to stop printing, which stops the printing process performed in the image forming mechanism 400, occurs or not is monitored by the image forming mechanism 400. Here, as the factor to stop printing, for example, a temperature drop in a heating member mounted in the fixing device 420 (refer to FIG. 2) is provided. Moreover, a switching process to switch a sheet container that is a supplier of the sheets to another sheet container in response to running out of the sheet is also provided.

In the case where the factor to stop printing occurs, the printing process in the image forming mechanism 400 is temporarily suspended, and output of the image data from the area for output images to the image forming mechanism 400 is also temporarily suspended. On the other hand, reading of image by the image reading mechanism 300 is continued, and accordingly, available area gradually becomes smaller in the area for output images.

Then, in the exemplary embodiment, it is determined that whether the available area in the area for output images is lost or not (step 508), and in the case where there are no available areas in the area for output images, reading of image is temporarily halted (step 509). Next, in the exemplary embodiment, similar to the above description, it is determined whether any documents, reading of which is not yet finished (remaining documents), are in the image reading mechanism 300 or not (step 510). Then, in the case where it is determined that there are remaining documents, similar to the above description, reduction in reading speed of the documents and reallocation of each area in the RAM 104 are carried out (step 511).

Specifically, the area for image reading is reduced and the reduced area is allocated to the area for output images, as another example of the second area (hereinafter, the area allocated to the area for output images is sometimes referred to as "allocation area"). Thereafter, in the exemplary embodiment, reading of image is restarted (step 512). In the exemplary embodiment, this makes it possible to perform reading of the image even at the right in the middle of the suspension of the printing process, to thereby make it possible to perform reading of images on more documents.

When the reading speed of the documents is reduced, there occurs an excess in part of the area for image reading. In the exemplary embodiment, the excessive part in the area for image reading is allocated to the area for output images to increase the area for output images. In other words, in the exemplary embodiment, the above-described allocation area is added to the area for output images, and thereby the capacity of the area for output images is increased. It should be noted that, also in this case, allocation is performed such that the initially-reserved area for output images and the allocation area are continued. This suppresses occurrence of fragmentation in this case, too. It should be noted that, similar to the above description, it may be possible to decrease the resolution in reading the image by the image reading mechanism 300 to make an excess in part of the area for image reading.

Here, in a configuration in the exemplary embodiment, reading of the documents is performed even at the right in the middle of the suspension of the printing process, though the reading speed of the document is reduced. This makes it possible to perform reading of images on more documents. To be described more specifically, in the exemplary embodiment, in a case where the remaining document include merely several number of sheets, for example, reading of image of all the documents is completed without waiting for restarting the printing process by the image forming mechanism 400.

With reference to FIG. 12, the process in the exemplary embodiment will be described further.

In this process, when the factor to stop printing is removed, the printing is restarted in the image forming mechanism 400 (step 513). Specifically, output of the image data stored in the area for output images to the image forming mechanism 400 is restarted, and in the image forming mechanism 400, formation of the image on the sheet is performed again. Then, in the exemplary embodiment, when all the printing process is completed (step 514), the RAM 104 is opened (step 515) and the job is ended (step 516). It should be noted that, in the case where it is determined in step 510 that there are no remaining documents, the process of step 513 is carried out without performing the processes in step 511 and step 512.

By the way, if the image data is outputted from the area for output images to the image forming mechanism 400 after restarting the printing, there is a possibility that the above-described allocation area becomes available and the allocation area becomes unnecessary. In such a case, in the exemplary embodiment, the main CPU 102A that also functions as a reallocation unit allocates the allocation area to the area for image reading, which is an original area, to restore the capacity of the area for image reading and the capacity of the area for output images.

Further, in this case, in the exemplary embodiment, the main CPU 102A that also functions as a resetting unit resets the reading speed of the documents having been reduced to the original reading speed. In other words, the amount of image data generated per unit time by the image reading mechanism 300 is reset at the original amount, which is the amount before reduction is carried out. In the exemplary embodiment, this makes it possible to read the documents at the original, fast speed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment as chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image reading unit that reads an image on a document at a predetermined image reading speed and generates image data;

a memory that includes a first area temporarily storing the image data outputted from the image reading unit and a second area storing the image data having been read from the first area and subjected to processing, the memory temporarily storing the image data;

an image forming unit that forms an image on a recording material based on the image data stored in the memory, which has been subjected to the processing;

a reducing unit that, in a case where an amount of the image data stored in the second area exceeds a predetermined amount, reduces an amount of the image data generated per unit time by the image reading unit;

an allocation unit that, in a case where the amount of the image data stored in the second area exceeds the predetermined amount, allocates a partial area contained in the first area to the second area, wherein, in a case where the amount of the image data stored in the second area exceeds the predetermined amount due to suspension of an image forming process by the image forming unit, the reducing unit reduces the amount of the image data generated per unit time by the image reading unit, and in the case where the amount of the image data stored in the second area exceeds the predetermined amount due to suspension of an image forming process by the image forming unit, the allocation unit allocates the partial area to the second area, wherein the image forming apparatus further comprises:

a reallocation unit that, in a case where an amount of the image data stored in the partial area allocated to the second area becomes less than a predetermined amount due to restart of the image forming process that has been suspended, reallocates the partial area to the first area, which is an original area; and a resetting unit that, in the case where an amount of the image data stored in the partial area allocated to the second area becomes less than the predetermined amount due to restart of the image forming process that has been suspended, resets the amount reduced by the reducing unit at an original amount.

2. The image forming apparatus according to claim 1, wherein the image reading unit reads a plurality of pages of a document contained in a document bundle one by one and sequentially generates image data corresponding to each page, the image forming unit starts an image forming process in a case where the image data of the each page sequentially outputted to the second area via the first area is stored in the second area and the image data of all pages contained in the document bundle is stored in the second area, in a case where the amount of the image data stored in the second area exceeds the predetermined amount before the image data of all the pages contained in the document bundle is stored in the second area, the reducing unit reduces the amount of the image data generated per unit time by the image reading unit, and in a case where the amount of the image data stored in the second area exceeds the predetermined amount before the image data of all the pages contained in the document bundle is stored in the second area, the allocation unit allocates the partial area to the second area.

3. The image forming apparatus according to claim 1, wherein the allocation unit allocates the partial area to the second area such that the partial area and the second area are continued on the memory.

4. The image forming apparatus according to claim 1, wherein, in a case where the amount of the image data stored in the second area exceeds the predetermined amount, and there are any documents not yet read by the image reading unit, the reducing unit reduces the image reading speed, and the allocation unit allocates the partial area contained in the first area to the second area.

5. The image forming apparatus according to claim 1, wherein the reducing unit reduces the amount of the image data generated per unit time by the image reading unit, in a case where the image reading unit reads an image on a document transported by a document transport mechanism, by reducing a transport speed of the document, and in a case where the image reading unit reads an image on a document placed on a document glass by moving an image reading section, by reducing the moving speed of the image reading section.

6. A controlling device comprising:

an image data obtaining unit that obtains image data generated by an image reading unit that reads an image on a document at a predetermined image reading speed and generates the image data;

a memory that includes a first area temporarily storing the image data obtained by the image data obtaining unit and a second area storing the image data having been read from the first area and subjected to processing, the memory temporarily storing the image data;

a sending unit that sends the image data subjected to the processing stored in the memory to an image forming unit that forms an image on a recording material;

a reducing unit that, in a case where an amount of the image data stored in the second area exceeds a predetermined amount, reduces an amount of the image data generated per unit time by the image reading unit;

an allocation unit that, in a case where the amount of the image data stored in the second area exceeds the predetermined amount, allocates a partial area contained in the first area to the second area wherein, in the case where the amount of the image data stored in the second area exceeds the predetermined amount due to suspension of an image forming process by the image forming unit, the reducing unit reduces the amount of the image data generated per unit time by the image reading unit, and in a case where the amount of the image data stored in the second area exceeds the predetermined amount due to suspension of an image forming process by the image forming unit, the allocation unit allocates the partial area to the second area, wherein the controlling device further comprises:

a reallocation unit that, in a case where an amount of the image data stored in the partial area allocated to the second area becomes less than a predetermined amount due to restart of the image forming process that has been suspended, reallocates the partial area to the first area, which is an original area; and a resetting unit that, in the case where an amount of the image data stored in the partial area allocated to the second area becomes less than the redetermined amount due to restart of the image forming process that has been suspended, resets the amount reduced by the reducing unit at an original amount.

7. A non-transitory computer readable medium storing a program that causes a computer to execute a process for forming an image, the process comprising:
  reading an image on a document at a predetermined image reading speed and generating image data;
  controlling to temporarily store the generated image data in a first area on a memory and to store the image data having been read from the first area and subjected to processing in a second area on the memory;
  forming an image on a recording material based on the image data stored in the memory, which has been subjected to the processing;
  in a case where an amount of the image data stored in the second area exceeds a predetermined amount clue to suspension of an image forming process by the step of forming the image, reducing an amount of the image data generated per unit time;
  in a case where the amount of the image data stored in the second area exceeds the predetermined amount due to the suspension of the image forming process, allocating a partial area contained in the first area to the second area;
  in the case where an amount of the image data stored in the partial area allocated to the second area becomes less than a predetermined amount, reallocating the partial area to the first area, which is an original area; and
  in a case where an amount of the image data stored in the partial area allocated to the second area becomes less than the predetermined amount, resetting the amount reduced by the reducing step at an original amount.

* * * * *